US009134703B2

(12) United States Patent
Vuille et al.

(10) Patent No.: US 9,134,703 B2
(45) Date of Patent: Sep. 15, 2015

(54) AT LEAST PARTIALLY ENAMELLED RELIEF DIAL

(75) Inventors: Pierry Vuille, Coffrane (CH); Frédéric Jeanrenaud, La Chaux-de-Fonds (CH)

(73) Assignee: The Swatch Group Research and Development Ltd, Marin (CH)

( * ) Notice: Subject to any disclaimer, the term of this patent is extended or adjusted under 35 U.S.C. 154(b) by 892 days.

(21) Appl. No.: 13/046,049

(22) Filed: Mar. 11, 2011

(65) Prior Publication Data

US 2011/0222378 A1 Sep. 15, 2011

(30) Foreign Application Priority Data

Mar. 12, 2010 (EP) .................................... 10156414

(51) Int. Cl.

| | |
|---|---|
| ***G04B 19/06*** | (2006.01) |
| ***B32B 3/00*** | (2006.01) |
| ***G04D 99/00*** | (2006.01) |
| ***B23P 23/04*** | (2006.01) |
| ***G04B 19/12*** | (2006.01) |
| ***G04B 19/14*** | (2006.01) |

(52) U.S. Cl.

CPC .............. *G04B 19/065* (2013.01); *G04B 19/12* (2013.01); *G04B 19/14* (2013.01); *Y10T 29/49888* (2015.01)

(58) Field of Classification Search

CPC ........ G04B 19/12; G04B 19/10; G04B 19/14; G04B 19/065; G04B 19/103

See application file for complete search history.

(56) References Cited

U.S. PATENT DOCUMENTS

| | | | | |
|---|---|---|---|---|
| 762,082 | A | 6/1904 | Nichols | |
| 4,583,866 | A * | 4/1986 | Kasai et al. | 368/232 |
| 5,044,961 | A * | 9/1991 | Bruskewitz | 434/304 |

(Continued)

FOREIGN PATENT DOCUMENTS

| | | |
|---|---|---|
| EP | 1 640 822 A1 | 3/2006 |
| JP | 52 045469 | 3/1977 |

(Continued)

OTHER PUBLICATIONS

Cambridge Dictionary: http://dictionary.cambridge.org/us/dictionary/british/stand-out-in-relief. Copyright 2014.*

(Continued)

*Primary Examiner* — David Sample
*Assistant Examiner* — Nicole T Gugliotta
(74) *Attorney, Agent, or Firm* — Griffin & Szipl, P.C.

(57) ABSTRACT

The invention relates to an at least partially enamelled dial whose visible surface includes areas standing out in relief, including a first part made of ceramic material or another compatible substrate that may or may not be coated with enamel including at least one through hole and at least one second part made of ceramic material or another compatible substrate that may or may not be coated with enamel. According to the invention, said at least one second part includes a main, projecting face which is larger than the section of said at least one hole and said at least one second part is secured to the first part to totally cover the periphery of said at least one hole without the second part projecting into the hole, so as to form a relief dial with improved rendering.

The invention also relates to the method of manufacturing this type of dial. The invention concerns the field of at least partially enamelled dials.

23 Claims, 5 Drawing Sheets

(56) References Cited

U.S. PATENT DOCUMENTS

| | | | | |
|---|---|---|---|---|
| 7,420,884 | B2 * | 9/2008 | Dubach et al. | 368/232 |
| 2006/0062971 | A1 | 3/2006 | Bourban et al. | |
| 2007/0230287 | A1 * | 10/2007 | Gruosi | 368/223 |
| 2010/0214882 | A1 | 8/2010 | Bourban et al. | |

FOREIGN PATENT DOCUMENTS

| | | | | |
|---|---|---|---|---|
| JP | 52-045469 U | * | 3/1977 | G04B 19/06 |
| JP | 51-045469 | * | 4/1977 | B65D 7/24 |

OTHER PUBLICATIONS

Search Report issued in corresponding application EP 10156414, completed Aug. 27, 2010.

G.-A. Berner, Foot, Illustrated Professional Dictionary of Horology I+II 851-52 (2002).

Nacre, Wikipedia, http://en.wikipedia.org/wiki/Mother-of-pearl (downloaded Feb. 27, 2015).

Vitreous enamel, Wikipedia, http://en.wikipedia.org/wikiNitreious_enamel (downloaded Feb. 27, 2015).

* cited by examiner

AT LEAST PARTIALLY ENAMELLED RELIEF DIAL

This application claims priority from European Patent Application No. 10156414.4 filed Mar. 12, 2010, the entire disclosure of which is incorporated herein by reference.

FIELD OF THE INVENTION

The invention relates to a totally or at least partially enamelled dial and, more specifically, a dial of this type whose visible surface stands out in relief, i.e. a dial including several levels which may be enamelled.

BACKGROUND OF THE INVENTION

To form timepiece dials it is known to deposit a layer of enamel on the visible surface thereof to considerably improve the quality of their appearance.

FIG. 1 shows an example timepiece 1, whose dial 3 includes most of the manufacturing pitfalls that may be encountered. Dial 3 thus includes a main plane P forming the broadest visible face.

As seen in FIG. 1, above plane P, dial 3 may have fitted thereon an hour circle 2 and/or a secondary display 4 formed by at least one index and/or at least one alphanumerical symbol.

Dial 3 may also include a secondary display 5 whose visible surface is mounted along a plane $P_{+1}$ above plane P so as to form a raised zone. Conversely, dial 3 may also include a secondary display 6 whose visible surface is mounted along a plane $P_{-1}$ underneath plane P so as to form a recessed or hollow area. Dial 3 may also include an aperture 7, i.e. an opening in dial 3 for showing part of movement 8 mounted underneath dial 3, like a moon phase in the example in FIG. 1.

Finally, dial 3 also includes holes allowing a member of movement 8 to pass through dial 3, such as for example arbours for mounting the hands of timepiece 1.

The example illustrated in FIG. 2 partially shows a known embodiment of enamelled dial 3 which includes a secondary display 6 which is mounted in a plane $P_{-1}$ underneath plane P so as to form a hollow or recessed area 9. Area 9 is intended to receive, for example, the graduations and display hand via hole 10.

FIG. 2 shows that dial 3 is formed by a base 13 including feet 14 and on which a first enamelled, pierced plate 15 is mounted, the visible surface of which forms plane P. Dial 3 also includes a second enamelled plate 17, which is mounted in the pierced hole in first plate 15 forming an interstice 16 and whose visible face forms a lower, hollow or recessed plane $P_{-1}$.

This configuration advantageously provides a totally enamelled dial 3 since only enamelled plates 15 and 17 are visible. However, this configuration requires a very high level of precision for the dimensions of plates 15 and 17 to make the visual rendering of interstice 16 acceptable. Indeed, the external wall of plate 17 must be a perfect, regular fit for the wall of the pierced hole made in plate 15 otherwise continuous or odd gaps may appear which makes dial 3 visually unacceptable for integration in a timepiece 1.

Consequently, the embodiment of FIG. 2 leads to an excessively high reject rate and a requirement for manufacturing precision that only further increase the manufacturing cost of enamelled dials, which are already very high for structural reasons.

SUMMARY OF THE INVENTION

It is an object of this invention to overcome all or part of the aforecited drawbacks by proposing a method of manufacturing an at least partially enamelled relief dial wherein the reject rate caused by said interstice is substantially zero and which provides a dial with greatly improved rendering.

The invention therefore relates to an at least partially enamelled dial, whose visible surface includes areas standing out in relief, said dial including a first part formed by a first substrate including at least one hole and at least one second part formed by a second substrate, characterized in that at least one of the parts includes an enamel coated substrate forming one part of said visible surface of the dial, and in that said at least one second part is secured to the first part so as to totally cover the periphery of said at least one hole without projecting therein, so as to form a relief dial with improved rendering.

Consequently, it is clear that there is a change from a gap to an interface between the two parts. The advantage of this is immediately apparent as regards the very clear rendering of the interface.

In accordance with other advantageous features of the invention:

- said at least one second part is secured on top of the visible face of said first part so as to form a raised zone relative to the rest of the visible surface of the dial;
- said at least one second part is secured onto the opposite face to the visible face of said first part to form a bottom underneath said at least one hole and thereby form a hollow or recessed area relative to the rest of the visible surface of the dial;
- the dial has a third part including a substrate which is secured to one of the first two parts to form an additional level on the dial;
- the dimensions of the first part and said at least one second part are substantially identical;
- at least one of the parts includes a nacre coated substrate;
- the parts are secured to each other by an adhesive material or by an enamel layer;
- the part forming the top portion of the dial includes a substrate coated with a second enamel whose solidification temperature is at least 100° C. higher than that of the enamel securing layer;
- the second enamel of the part forming the top portion of the dial is partially covered by a third enamel whose solidification temperature is at least 100° C. lower than that of the second enamel so as to form decorations on top of the second enamel;
- the dial includes a base with at least one foot secured to the opposite face to the visible face of the dial;
- the dial includes at least one fixing nail that partially passes through the dial, the end of whose stem is used as a foot for the dial and whose head is secured between two of said parts;
- the dial includes at least one fixing nail that completely passes through the dial, the end of whose stem is used as a foot for the dial and whose head rests on the visible surface of said dial thus forming a visible decoration.

The invention also relates to a timepiece, characterized in that it includes a dial according to any of the preceding variants.

Finally, the invention relates to a method of manufacturing an at least partially enamelled dial, whose visible surface includes areas standing out in relief, said method including the following steps:

a) forming a first part;

b) forming at least one hole in the first part;

c) forming a second part;

characterized in that at least one of the parts is enamelled and in that the method further includes the following step:

d) securing the second part to the first part so as to totally cover the periphery of said at least one hole, without projecting therein, to form the final dial.

Consequently, the advantage is immediately apparent as regards the very neat rendering of the interface but also as regards manufacturing, since the parts no longer need to be so precise, and the machining and positioning tolerances for the various parts are thus considerably relaxed.

In accordance with other advantageous features of the invention:

between steps c) and d), the method includes a step of mounting at least one nail, including the phases of piercing a hole for each nail in one of the parts and introducing each nail into the associated hole, the end of the stem of said nail jutting out to form a foot for the dial and the head of said nail being placed against said one part so that, during securing step d) the nail head is trapped between said parts;

securing step d) is achieved by bonding;

step a) includes phase e): taking a first plate and steps c) and d) are carried out at the same time and include the following phases: h) taking a second part, i) enamelling the second part, j) stacking the second part on the first part so as to totally cover the periphery of said at least one hole without projecting therein, and k) solidifying the enamel by firing so as to secure said parts to each other and thereby form the final dial;

after step e), step a) includes: phase f) enamelling the first plate using a second enamel whose solidification temperature is at least 100° C. higher than that of the enamel securing layer and phase g) solidifying the second enamel by firing;

during phase i), the second enamel is at least partially enamelled with a third enamel whose solidification temperature is at least 100° C. lower than that of the second enamel so as to form, during securing phase k), a decoration on top of the second enamel;

between phases i) and j), the method includes a step of mounting at least one nail, including the phases of piercing a hole for each nail in one of the parts and introducing each nail into the associated hole, the end of the stem of said nail jutting out to form a foot for the dial and the head of said nail being placed against said one part so that, during securing step k) the nail head is trapped between said parts;

the method includes a final step of mounting at least one nail, including the following phases: piercing a hole for each nail through the entire dial and introducing each nail into the associated hole, the end of the stem of said nail jutting out to form a foot for the dial and the head of said nail being mounted on the visible surface of said dial to form a visible decoration;

the method includes a final step of securing at least one foot to the face opposite the visible face of the dial.

BRIEF DESCRIPTION OF THE DRAWINGS

Other features and advantages will appear clearly from the following description, given by way of non-limiting indication, with reference to the annexed drawings, in which.

DETAILED DESCRIPTION OF PREFERRED EMBODIMENTS

The examples illustrated in FIGS. 3 to 7 show dial examples 23, 43, 63, 83 and 103 according to the invention. Of course, these examples are not limiting and others may be envisaged in light of the explanations given below. It is a first object of the invention to considerably improve the rendering of enamelled dials. This is made possible by the total removal of the aforementioned interstice 16 which is replaced with totally overlapping areas.

Thus, according to the invention, the dial includes a first part formed by a first substrate including at least one hole and at least one second part formed by a second substrate, one of the substrates being enamelled, said at least one second part including a main, projecting face which is larger than the section of said at least one hole so as to totally cover the periphery of said at least one hole without projecting therein. Consequently, it is clear that there is a change from a gap to an interface between the two parts. The advantage is immediately apparent as regards the very clear rendering of the interface but also as regards manufacturing, wherein the parts no longer need to be so precise. Moreover, it is clear that the parts are used to each form one part of said visible surface of the dial.

Preferably, the substrate is formed from ceramic material, however, other materials may be envisaged such as, for example, a silicon-based metalloid, a metal or metal alloy. Likewise, if at least one of the substrates is enamel coated, the other substrate(s) may also be and/or be coated differently such as, for example, with nacre while maintaining the same advantage of improved rendering of the dial.

Figure 3:
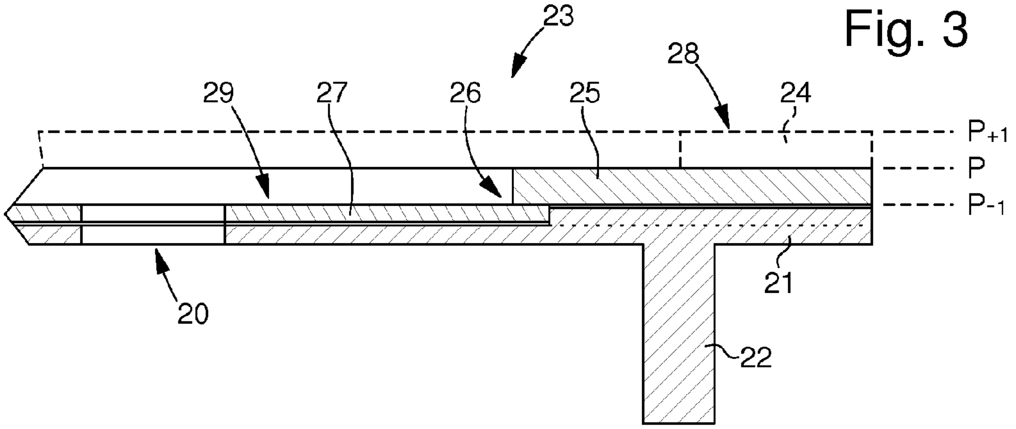
FIGS. 3 to 7 are sections of variants of the dial according to the invention.
Figure 4:
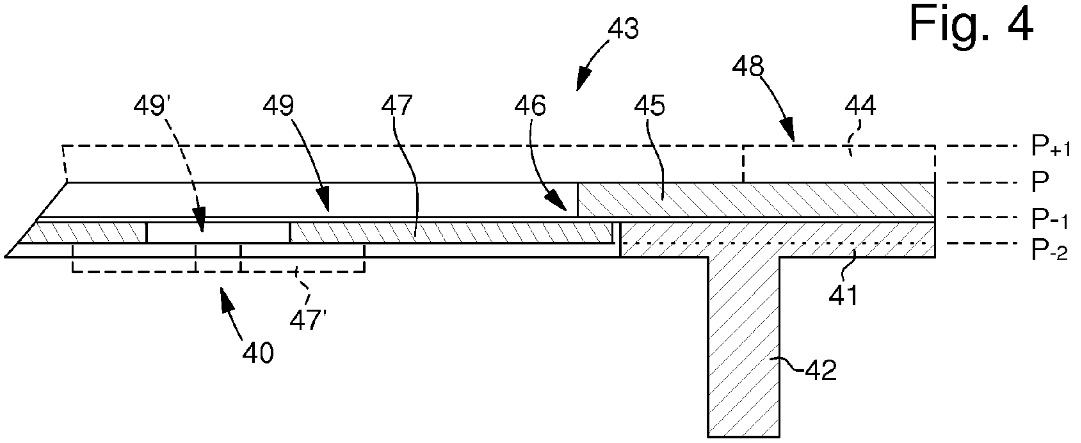
Figure 5:
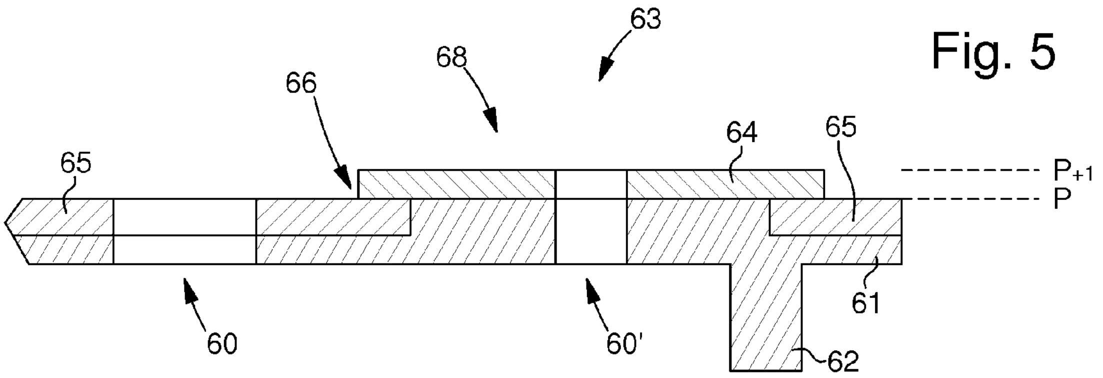
Figure 6:
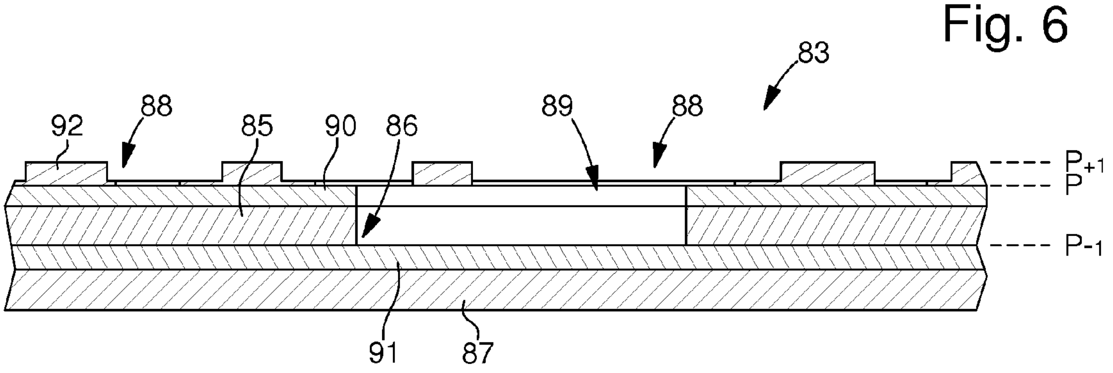
Figure 7:
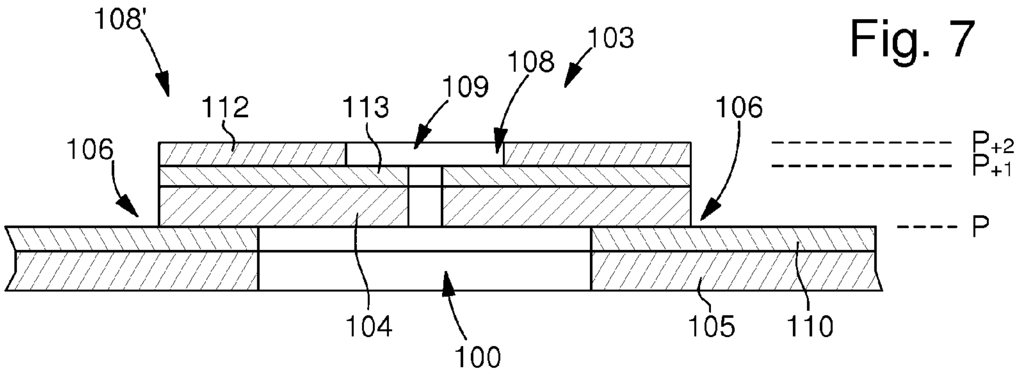

FIGS. 3, 4 and 6 show variants of the same type as the hollow or recessed areas 6 presented above, i.e. areas which form a plane $P_{-x}$ underneath main plane P of the dial 23, 43, 83. FIGS. 5 and 7 show variants of the same type as the raised areas 5 presented above, i.e. areas which form a plane $P_{+x}$ on top of main plane P of the dial 63, 103. Of course, as will be explained below, raised and hollow areas may also be present on the same dial.

The first example illustrated in FIG. 3 shows a dial 23 for a timepiece, which includes a base 21 whose bottom face includes feet 22 for mounting dial 23 in the timepiece and an opening 20, for communication with the movement underneath dial 23 so as to form an aperture and/or a hole allowing a member of the movement to pass through.

A first part 25, for example made of enamelled ceramic material, which includes at least one hole, is mounted on base 21. The top face of the first part 25 thus forms main plane P of the dial, i.e. the broadest visible surface. In order to form a hollow or recessed area 29 at a level $P_{-1}$, a second part 27, for example made of enamelled ceramic material, is mounted so as to totally cover the periphery of said at least one hole underneath first part 25 without the second part 27 projecting into the hole.

For easier manufacture of dial 23, base 21 includes a countersink for receiving the second part 27, whose depth substantially matches the thickness of second part 27.

The visible face of dial 23 is thus entirely enamelled, standing out in relief, with an aperture 20 for communication with the movement and wherein the interface 26 between parts 25 and 27 has considerably improved rendering while greatly relaxing the machining and positioning tolerances of the various parts.

It is of course possible to add at least one level of relief to dial 23, for example $P_{+1}$ or $P_{-2}$, while maintaining the same rendering qualities. As seen in dotted lines in FIG. 3, it is thus possible to mount, for example, a third part 24 covering first part 25 so as to form a raised area 28, i.e. an area that forms a plane $P_{+1}$ above main plane P.

Finally, since the important thing is for second part 27 to totally cover the periphery of said at least one hole, said second part may alternatively have the same dimensions as first part 25, as illustrated in dotted lines in FIG. 3.

A second example illustrated in FIG. 4 shows a dial 43 for a timepiece, which has a base 41 whose bottom face includes feet 42 for mounting dial 43 in the timepiece. Dial 43 also includes an aperture 40 for communication with the movement underneath dial 43, to form an aperture and/or a hole for a member of the movement to pass through.

A first part 45, for example made of enamelled ceramic material, which includes at least one hole, is mounted on base 41. The top face of the first part 45 thus forms main plane P of the dial, i.e. the broadest visible surface. To form a hollow or recessed area 49 at a level $P_{-1}$, a second part 47, for example, made of enamelled ceramic material is mounted to totally cover the periphery of said at least one hole underneath the first part 45 without the second part 47 projecting into the hole and preferably without, however, cooperating with base 41.

The visible face of dial 43 is thus entirely enamelled, standing out in relief, with an aperture 40 for communicating with the movement and whose interface 46 between parts 45 and 47 has considerably improved rendering.

It is of course possible to add at least one level of relief to dial 43, for example $P_{+1}$ or $P_{-2}$, while maintaining the same rendering qualities. As seen in dotted lines in FIG. 4, it is thus possible to mount, for example, a third part 44 totally covering first part 45, so as to form a raised area 48, i.e. an area that forms a plane $P_{+1}$ on top of main plane P. It is also perfectly possible to mount, for example, a fourth part 47' to cover second part 47 so as to form a hollow area 49', i.e. an area that forms a plane $P_{-2}$ underneath plane $P_{-1}$.

Finally, similarly to the first example, second part 47 may alternatively have the same dimensions as first part 45, as illustrated in dotted lines in FIG. 4. In such case, base 41 would then only be attached to second part 47 and no longer to first part 45.

A third example illustrated in FIG. 5 shows a dial 63 for a timepiece, which has a base 61 whose bottom face includes feet 62 for mounting dial 63 in the timepiece. Dial 63 also includes an aperture 60, 60' for communication with the movement underneath dial 63, to form an aperture and/or a hole for a member of the movement to pass through.

A first part 65, for example made of enamelled ceramic material, which includes at least one hole, is mounted on spotfaced areas of base 61. The top face of the first part 65 thus forms main plane P of the dial, i.e. the broadest visible surface. In order to form a hollow zone 68 at a level $P_{+1}$, a second part 64, for example made of enamelled ceramic material, is mounted so as to totally cover the periphery of said at least one hole of first part 65 and, in the example illustrated in FIG. 5, of said non spotfaced portion of base 61, without the second part 67 projecting into the hole.

The visible face of dial 63 is thus entirely enamelled, standing out in relief, with an aperture 60, 60' for communicating with the movement and whose interface 66 between parts 65 and 64 has considerably improved rendering.

In a similar manner to the first and second examples, it is of course possible to add at least one level of relief to dial 63, for example $P_{+2}$ or $P_{-1}$, while maintaining the same rendering qualities or even for the first part 65 to extend over substantially the entire surface of dial 63 apart from apertures 60, 60'.

According to the invention, parts 24-25-27, 44-45-47-47' and 64-65 may be secured to each other by means of an adhesive material such as, for example, a polymer adhesive. These parts may also be secured to the base 21, 41, 61 thereof by means of an identical or different adhesive material.

It is also possible to envisage securing the parts to each other by deliberately utilising the temperature differences necessary for enamelling the parts. Thus, it is perfectly possible to use a combination of two types of enamel which have different solidification firing temperatures, i.e. preferably, differing by at least 100° C. To achieve this, for example, low fire and high fire enamels that have different solidification temperatures are used, to secure the two parts to each other. By way of example, the low fire enamel may, for example, solidify around 600° C. and the high fire enamel around 1,000° C. This temperature difference, which is much larger than 100° C., is chosen so that, during the firing of the low fire enamel, the high fire enamel structure is not affected or barely affected. Two further examples are shown in FIGS. 6 and 7 to better explain this variant of the invention.

A fourth example illustrated in FIG. 6 shows a dial 83 for a timepiece, which has a first part 85-90, for example made of enamelled ceramic material, which includes at least one hole. The top face of the first part 85-90 thus forms main plane P of the dial, i.e. the broadest visible surface. In order to form a hollow zone 89 at a level $P_{-1}$, a second part 87-91, for example made of enamelled ceramic material, is mounted so as to totally cover the periphery of said at least one hole underneath first part 85-90 without the second part 87-91 projecting into the hole.

The visible face of dial 83 is thus entirely enamelled, standing out in relief, and the interface 86 between parts 85-90 and 87-91 also has considerably improved rendering. To make the explanation easier, in the example illustrated in FIG. 6 the parts are not shown to the same scale.

FIG. 6 thus shows that the first part 85-90 is secured to the second part 87-91 via enamel layer 91 of said second part which is preferably a low fire enamel. Enamel layer 90 of first part 85-90 is thus preferably a high fire enamel. Consequently, with this variant, it is clear that the use of an adhesive material is no longer necessary.

Evidently, the use of the terms "low fire" and "high fire" must not restrict the enamels that can be used to fabricate the dial. Thus, it is perfectly possible for both the enamels to be considered low fire enamels provided that the difference in solidification temperature does not affect the structure of the higher temperature enamel when the lower temperature enamel is solidified. This situation is generally allowed when the temperature difference is greater than at least 100° C. However, depending upon the enamels used this difference may be smaller or larger. To simplify the explanations below, the terms "low fire" and "high fire" are used to distinguish this difference in solidification temperature.

Figure 1:
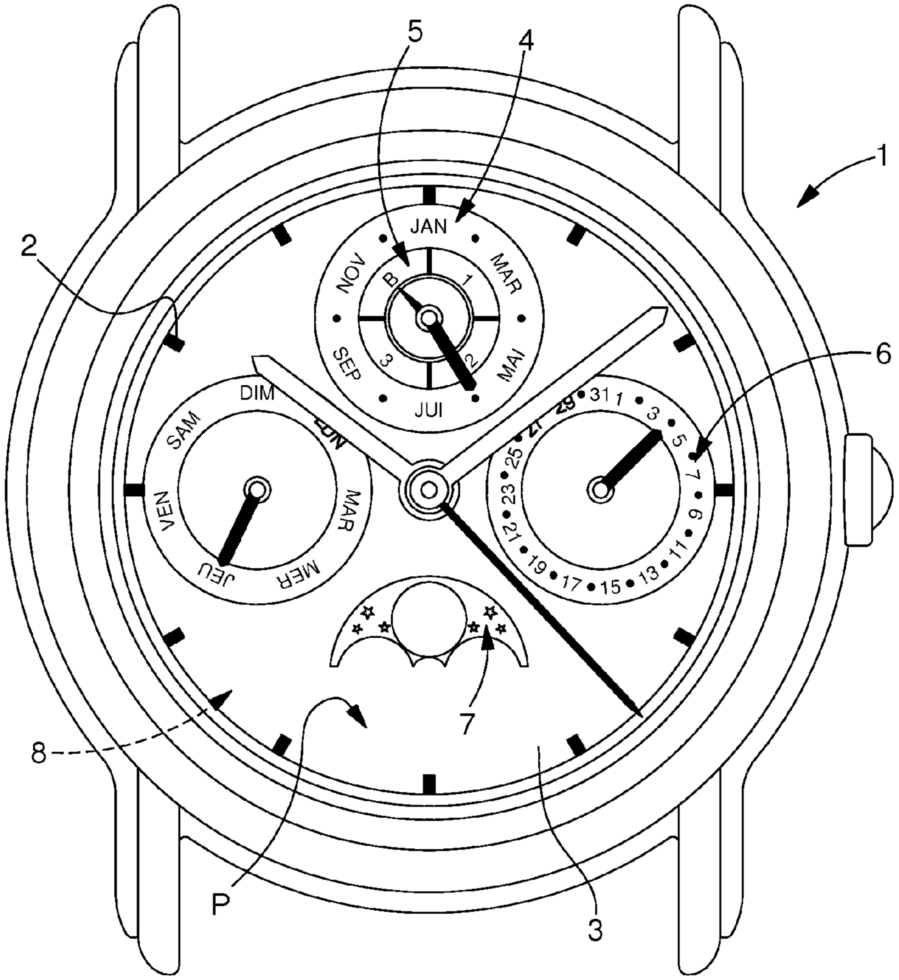
FIG. 1 is a front elevation view of a timepiece.
Figure 2:
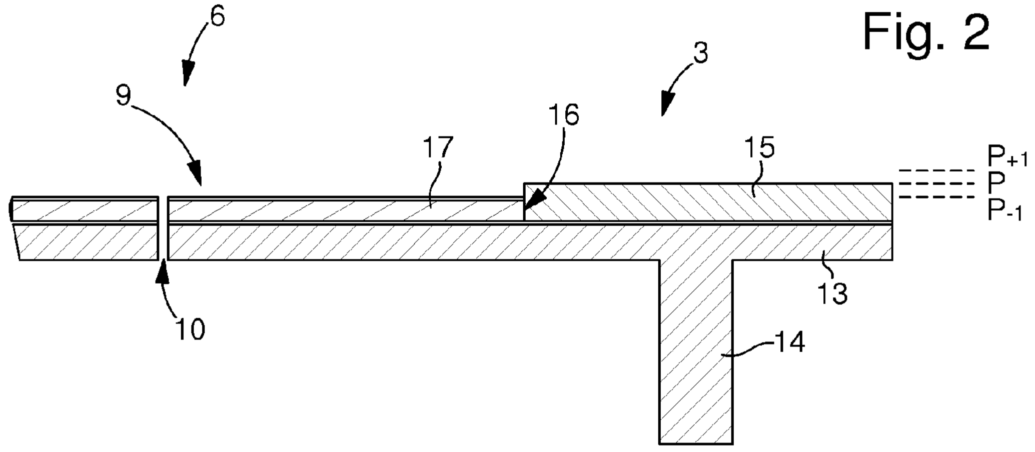
FIG. 2 is a diagram of one section of a dial according to a known embodiment.

According to another advantage of this variant, it is also easy to form a display of the same type as areas 2 and/or 4 shown in FIG. 1, i.e. areas that are added onto plane P thus forming raised areas 88 at a level $P_{+1}$ outside each hollow or recessed area 89. This is made possible by the fact that the high fire enamel 90 of first part 85-90 is partially covered by a second, low fire enamel 92, i.e. whose solidification temperature is at least 100° C. lower than that of layer 90. The firing of enamel layers 91 and 92 can be carried out separately, but also simultaneously if the solidification temperature of the two enamels 91 and 92 are compatible.

It is of course still possible to add at least one level of relief to dial 83, for example $P_{+2}$ or $P_{-2}$, while maintaining the same rendering qualities. Likewise, dial 83 can include at least one aperture in order to communicate with the movement. Moreover, since the important thing is for second part 87-91 to totally cover the periphery of said at least one hole, said second part may or may not have the same dimensions as first part 85-90. Finally, as for the first three examples, a base including feet may also be added so as to mount dial 83 in the timepiece.

A fifth example illustrated in FIG. 7 shows a dial 103 for a timepiece, which has a first part 105-110, for example made of enamelled ceramic material, which includes at least one hole. The top face of the first part 105-110 thus forms main plane P of the dial, i.e. the broadest visible surface. In order to form a raised zone 108 at a level $P_{+1}$, a second part 104-113, for example made of enamelled ceramic material, is mounted so as to totally cover the periphery of said at least one hole on top of first part 105-110 without the second part 104-113 projecting into the hole.

The visible face of dial 103 is thus entirely enamelled, standing out in relief and the interface 106 between parts 105-110 and 104-113 also has considerably improved rendering and includes at least one aperture 100 so as to communicate with the movement. To make the explanation easier, in the example illustrated in FIG. 7 the parts are not shown to the same scale. FIG. 7 thus shows that the first part 105-110 is secured to the second part 104-113 via enamel layer 110 of said second part which is preferably a low fire enamel. Preferably, the enamel layer 113 of second part 104-113 is thus a high fire enamel, i.e. whose solidification temperature is at least 100° C. higher than that of the enamel securing layer 110.

Consequently, with this other variant also, it is clear that the use of an adhesive material is no longer necessary.

According to another advantage of this variant, it is also easy to form a display of the same type as areas 2 and/or 4 shown in FIG. 1, i.e. areas that are added onto plane $P+_1$ thus forming raised areas 108' at a level $P+_2$.

This is made possible by the fact that the high fire enamel 113 of second part 104-113 is partially covered by a second low fire enamel 112, i.e. whose solidification temperature is at least 100° C. lower than that of layer 113.

Of course it remains possible to add at least one level of relief to dial 103, for example $P_{+3}$ or $P_{-1}$, while maintaining the same rendering qualities. Finally, as for the first four examples, a base including feet may also be added so as to mount dial 103 in the timepiece.

In the fourth and fifth examples, low fire layers 92, 112 are shown, forming areas of type 2 and/or 4 of FIG. 1. These layers can form slopes and/or shoulders and/or colour differences relative to the layer, respectively 90, 113 that they cover so as to make said layers appear more clearly and/or offer a particular visual effect. It is evident that these type 92, 112 layers can perfectly well be applied to enamelled parts 24, 25, 27, 44, 45, 47, 47', 64 and/or 65 in order to obtain the same advantages.

Figure 8:
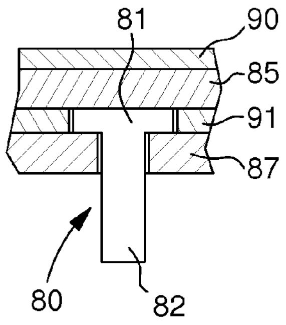
FIGS. 8 to 10 are alternative diagrams of feet for a dial according to the invention.
Figure 9:
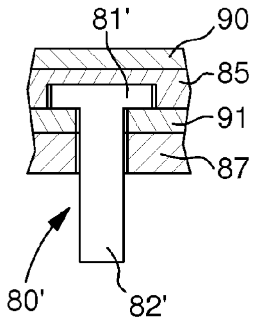
Figure 10:
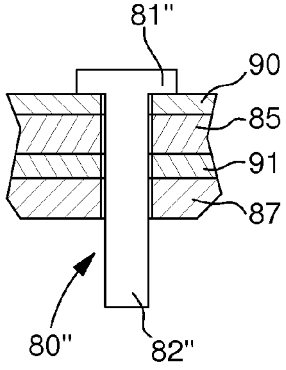

Advantageously according to the invention, a base 21, 41, 61 is not necessarily required for mounting dial feet. Thus, FIGS. 8 to 10 show alternative feet for a dial. According to the invention, the feet are formed by the end of the stem 82, 82', 82" of a nail 80, 80', 80" which is mounted to jut out below the dial. As for bases 21, 41, 61, the nails 80, 80', 80" may be, for example, made of metal, metal alloy or ceramic material.

According to the three alternatives, which can be applied equally to dials secured by an adhesive material and by an enamel layer, the head 81, 81', 81" of nail 80, 80', 80" is thus either trapped between two parts (FIGS. 8 and 9), or mounted on the visible surface of the dial (FIG. 10).

By way of example, the references of FIG. 6 have been used again for the explanation of FIGS. 8 to 10. However, the enamel securing layer 91 of FIG. 6 may also alternatively be a layer of adhesive material as specified above.

In a first alternative shown in FIG. 8, dial 83 includes a nail 80 whose stem 82 is mounted in a hole in ceramic plate 87. Moreover, the thickness of head 81 of nail 80 is substantially the same as enamel layer 91 and it is placed on the top face of plate 87.

From FIG. 8 it is clear that head 81 is trapped between the top face of plate 87 and the bottom face of ceramic plate 85 in the thickness of enamel layer 91. The portion of stem 82 projecting from the bottom face of plate 87 can thus advantageously act as a foot for dial 83 by cooperating, in the usual manner, with the movement to be secured thereto, for example, by means of a dial key or bolt.

In a second alternative shown in FIG. 9, dial 83 includes a nail 80' whose stem 82' is mounted in a hole in ceramic plate 87. Moreover, the thickness of head 81' of nail 80' is less than plate 85 and it is placed on the top face of enamel layer 91. From FIG. 9, it is clear that head 81' is trapped between the top face of layer 91 and the thickness of plate 85 by means of a spotface. The portion of stem 82' projecting from the bottom face of plate 87 can thus advantageously act as a foot for dial 83 by cooperating, in the usual manner, with the movement as in the first alternative.

In a third alternative shown in FIG. 10, dial 83 includes a nail 80" whose stem 82" is mounted in a hole formed through the entire thickness of dial 83, i.e. consecutively through enamel layer 90, plate 85, enamel layer 91 and plate 87. Moreover, head 81" of nail 80" is placed on the top face of enamel layer 90.

From FIG. 10, it is clear that head 81" forms a visible part of dial 83 and that it can thus be used to form a decoration of the same type as areas 2 and/or 4 shown in FIG. 1. The portion of stem 82" projecting from the bottom face of plate 87 can thus advantageously act as a foot for dial 83 by cooperating, in the usual manner, with the movement as in the first and second alternatives.

It is a second object of the invention to provide a method whose reject rate and manufacturing costs are considerably reduced. The method 119 of manufacturing one of dials 23, 43, 63, 83 and 103 according to the invention will now be explained with reference to FIGS. 11 to 18. Method 119 includes four main steps 120, 122, 124 and 126 as illustrated in single lines in FIG. 18.

The first step 120 consists in forming a first, preferably enamelled part. Preferably, each step of forming an enamel part consists, in a first phase 121, of taking a preferably ceramic plate, then, in a second phase 123, in enamelling the plate using a selected enamel and then, in a third and final phase 125, solidifying said selected enamel by firing, for example by placing in a furnace.

Then, in a second step 122, method 119 continues by forming at least one through hole in said first part. The third step 124 consists in forming at least one second, preferably enamelled part in the three phases 121, 123, 125 described above. Finally, the fourth step 126 consists in securing the second part to the first part so as to totally cover the periphery of said at least one hole, without the second part projecting into the hole, so as to form the final dial.

Figure 18:
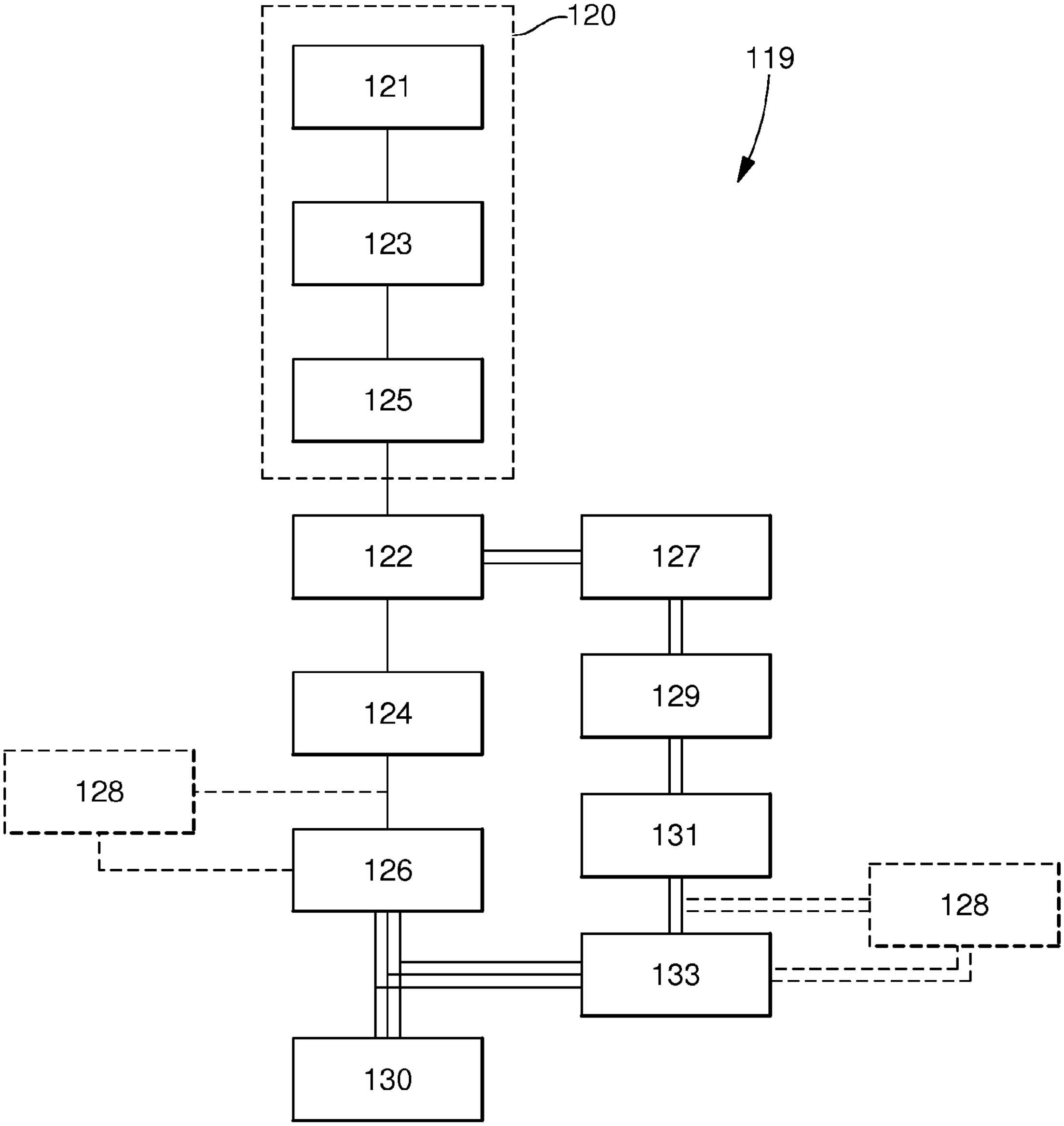
FIG. 18 is a flow diagram of the manufacturing method according to the invention.

As explained above, the securing step 126 may be performed by bonding using an adhesive material, such as, for example, a polymer adhesive. At the end of securing step 126, method 119 may, as illustrated in FIG. 18 in triple lines, include a final step 130 of securing at least one foot to the face opposite the visible face of the dial. As explained above, step 130 may also be performed by bonding using an identical or different adhesive material to that used in step 126.

Alternatively, step 130 may also consist in a final step of mounting at least one nail, including the phases of piercing a hole for each nail through the entire dial and introducing each nail into the associated hole, the end of the stem of said nail jutting out to form a foot for the dial and the head of said nail being mounted on the visible surface of said dial to form the alternative of FIG. 10.

However, one or other of steps 130 may advantageously be replaced by a step 128 illustrated in single dotted lines in FIG. 18. Step 128 consists in mounting at least one fixing nail between steps 124 and 126. In a similar manner to the above explanation, step 128 then includes the phase of piercing a hole for each nail in one of the parts, then a phase of introducing each nail into the associated hole, the end of the stem of said nail jutting out and the head of said nail being placed on one of the parts so that, in securing step 126, the nail head is trapped between said parts, to form the alternatives of FIGS. 8 and 9.

As explained above, step 126 of securing the parts to each other may be achieved by using enamels with different solidification temperatures in place of bonding. To better explain this variant of method 119 of the invention, FIGS. 11 to 17 are proposed with the references used for FIG. 6. It is clear that this variant of method 119 is in no way limited to the fabrication of the the FIG. 6 example. Indeed, these FIGS. 11 to 17 provide the teaching necessary to make, notably, the five examples illustrated in FIGS. 3 to 7.

Figure 11:
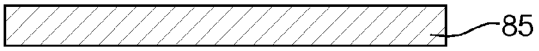
FIGS. 11 to 15 are diagrams showing steps of the manufacturing method according to the invention.
Figure 12:
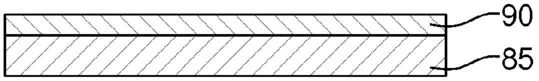

In this variant illustrated in FIGS. 11 to 15, method 119 thus includes a first step 120 consisting in forming a first enamelled part 85-90. Preferably, the formation step consists, in a first phase 121, in taking a preferably ceramic plate 85 as seen in FIG. 11, then, in a second phase 123, in enamelling plate 85 using a high fire enamel 90, and then, in a third and final step 125, solidifying said high fire enamel by firing as seen in FIG. 12.

Figure 13:

Then, in a second step 122 illustrated in FIG. 13, method 119 continues by forming at least one through hole in said first part 85-90. In this variant, method 119 continues with third and fourth steps 124 and 126 which overlap, i.e. are performed at the same time.

Thus, as shown in double lines in FIG. 18, in this variant, method 119 continues with a phase 127 consisting in taking a second, preferably ceramic plate 87, then, in a phase 129, enamelling the second plate 87 using a low fire enamel 91. Phase 129 may, by way of example, be performed by pad or screen printing if it is not desired to completely cover plate 87.

Figure 14:
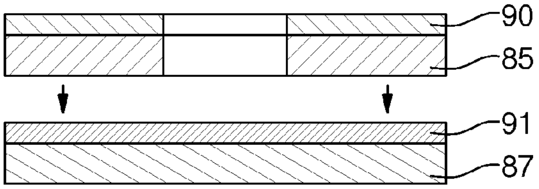
Figure 15:
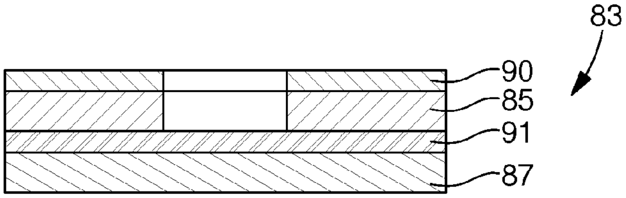

Then, as illustrated in FIG. 14, the variant of method 119 continues with phase 131, consisting in stacking the second part 87-91 underneath the first part 85-90 to totally cover the periphery of said at least one hole without the second part 87-91 projecting into the hole, and then with phase 133, consisting in solidifying low fire enamel 91 by firing so as to secure said parts to each other without the need for any additional adhesive material. According to the variant of method 119, a final enamelled dial 83 is obtained, as seen in cross-section in FIG. 15.

As illustrated in triple lines in FIG. 18, at the end of the securing phase 133, the variant of method 119 may also include a final step 130 of securing at least one foot to the face opposite the visible face of dial 83. Step 130 may be performed by bonding using an adhesive material such as, for example, a polymer adhesive.

Alternatively, step 130 may consist in a final step of mounting at least one nail, including the phase of piercing a hole for each nail through the entire dial 83, then the phase of introducing each nail into the associated hole, the end of the stem of said nail jutting out to form a foot for dial 83 and the head of said nail being mounted on visible surface 90 of said dial to form the FIG. 10 alternative.

However, one or other of steps 130 may advantageously be replaced by a step 128 illustrated in double dotted lines in FIG. 18. Step 128 consists in mounting at least one fixing nail between phases 131 and 133 in a similar manner to that between steps 124 and 126 explained above. Step 128 then includes the phase of piercing a hole for each nail in one of parts 87-91, then the phase of introducing each nail into the associated hole, the end of the stem of said nail jutting out and the head of said nail being placed on said one of parts 87-91 so that, in securing phase 133, the nail head is trapped between said parts 87-91, 85-90 to form the alternatives of FIGS. 8 and 9.

Figure 16:
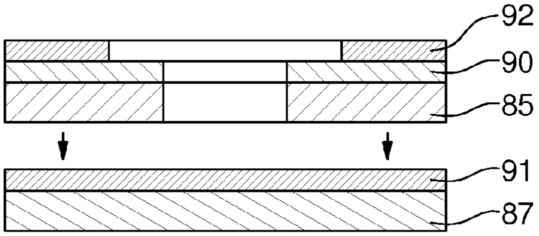
FIGS. 16 to 17 are diagrams of a variant of the manufacturing method according to the invention.
Figure 17:
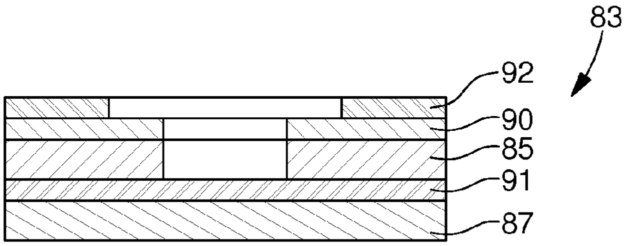

By way of complement, FIGS. 16 and 17 advantageously show that the embodiment of layers 92, 112 can easily be integrated into the variant of method 119 explained above. Therefore, after phases 121, 123, 125, step 122, then phase 127, method 119 is adapted by performing phase 129, as seen in FIG. 16, consisting in enamelling the second plate 87 using a low fire enamel 91 but also the first plate 85 using a second low fire enamel 92. Phase 129 may, for example, be carried out by pad or screen printing, if complete cover is not desired as is the case at least of enamel layer 92.

Then, as illustrated in FIG. 16, method 119 continues with phase 131 consisting in stacking the second part 87-91 underneath the first part 85-90-92 to totally cover the periphery of said at least one hole without second part 87-91 projecting into the hole, then with phase 133, consisting in solidifying low fire enamels 91, 92 by firing at the same time or separately, depending upon the difference in their solidification temperature, so as to secure said parts to each other, forming decoration 92 and thereby the final enamelled dial 83, as seen in cross-section in FIG. 17.

It is clear then that no great adaptation is necessary to form layers 92, 112 in the variant of method 119. However, to form layers 92, 112 in the case of method 119 shown in a single line in FIG. 18, a couple of phases 123 and 125 are necessary to form the high fire layer then the low fire layer respectively on the same plate.

Advantageously, it is clear that a large variety of dials of the invention can be fabricated using the teaching of the invention without, however, being limited simply to the examples presented above.

Of course, this invention is not limited to the illustrated example but is capable of various variants and alterations that will appear to those skilled in the art. In particular, depending upon the desired aesthetics and/or functions of the timepiece, the dial may be simplified or include more enamelled parts at a greater or lower height, with more or less varied enamel colours.

Finally, as explained above, even if the explanations were focussed on two enamelled ceramic parts, one of the two parts may be not enamelled ceramic, but formed of another material such as brushed metal or glass and/or having a different, for example, nacre coating.

It is thus clear that, although this does not cause any manufacturing problems where the securing is achieved by bonding, manufacture where securing is achieved by means of enamel limits the possible variants with another material, such as a brushed metal or glass and/or with a different, for example, nacre coating. Indeed, in such case, it will still be the enamelled part that supports the other part, i.e. part 87-91 in the example of FIG. 6 and part 105-110 in the example of FIG. 7.

What is claimed is:

1. A dial that is at least partially enamelled and has a visible surface that includes areas in relief, the dial comprising:

(a) a first part formed by a first substrate including at least one hole; and (b) at least one second part formed by a second substrate, wherein at least one of the parts includes an enamel coated substrate forming one part of the visible surface of the dial, wherein the at least one second part is secured fixedly to the first part and is arranged to totally cover the periphery of the at least one hole without projecting therein, thereby forming another part of the visible surface of the dial, and wherein the first part and the at least one second part are arranged to form a dial with a visible surface that includes a plurality of levels and with an interface without a gap between the first part and the at least one second part.

2. The dial according to claim 1, wherein the at least one second part is secured on top of the visible face of the first part so as to form a raised zone relative to the rest of the visible surface of the dial.

3. The dial according to claim 1, wherein the at least one second part is secured to the opposite face to the visible face of the first part to form a bottom underneath the at least one hole and thereby form a hollow area relative to the rest of the visible surface of the dial.

4. The dial according to claim 1, wherein the dial has a third part including a substrate which is secured to one of the first two parts to form an additional level on the dial.

5. The dial according to claim 1, wherein the first part and the at least one second part have substantially identical dimensions.

6. The dial according to claim 1, wherein at least one of the parts includes a nacre coated substrate.

7. The dial according to claim 1, wherein the parts are secured to each other by an adhesive material.

8. The dial according to claim 1, wherein the parts are secured to each other by an enamel layer.

9. The dial according to claim 8, wherein the part forming the top portion of the dial includes a substrate coated with a second enamel whose solidification temperature is at least 100° C. higher than that of the enamel securing layer.

10. The dial according to claim 9, wherein the second enamel of the part forming the top portion of the dial is partially covered by a third enamel whose solidification temperature is at least 100° C. lower than that of the second enamel so as to form decorations on top of the second enamel.

11. The dial according to claim 1, wherein a base including at least one foot is secured to the face opposite the visible face of the dial.

12. A dial that is at least partially enamelled and has a visible surface that includes areas standing out in relief, the dial comprising:

(a) a first part formed by a first substrate including at least one hole; and (b) at least one second part formed by a second substrate, wherein at least one of the parts includes an enamel coated substrate forming one part of the visible surface of the dial, wherein the at least one second part is secured to the first part and is arranged to totally cover the periphery of the at least one hole without projecting therein, wherein the first part and the at least one second part are arranged to form a dial with a visible surface that includes a plurality of levels and with an interface without a gap between the first part and the at least one second part, and wherein the dial includes at least one fixing nail passing partially through the dial, wherein the end of the stem of the nail is used as a foot for the dial and the head is secured between two of the parts.

13. The dial according to claim 1, wherein it includes at least one fixing nail completely passing through the dial, wherein an end of the at least one fixing nail stem is used as a foot for the dial and whose head rests on the visible surface of the dial thus forming a visible decoration.

14. A timepiece wherein it includes a dial according to claim 1.

15. A method of manufacturing an at least partially enamelled dial, that has a visible surface that includes areas standing out in relief, the method including the following steps:

a) forming a first part;

b) forming at least one hole in the first part;

c) forming a second part; and d) securing the second part to the first part so as to totally cover the periphery of said at least one hole without projecting therein, to form the final dial, wherein at least one of the parts is enamelled.

16. The method according to claim 15, wherein the securing step d) is achieved by bonding.

17. The method according to claim 15, wherein step a) includes the following phase:

e) taking a first plate;

and wherein steps c) and d) are performed at the same time and include the following phases:

h) taking a second part;

i) enamelling the second part;

j) stacking the second part against the first part so as to totally cover the periphery of the at least one hole without projecting therein;

k) solidifying the enamel by firing in order to secure the parts to each other and thereby form the final dial.

18. The method according to claim 17, wherein, after step e), step a) includes the following phases:

f) enamelling the first plate with a second enamel that has a solidification temperature that is at least 100° C. higher than that of the enamel securing layer; and g) solidifying the second enamel by firing.

19. The method according to claim 18, wherein, in phase i), the second enamel is at least partially enamelled with a third enamel that has a solidification temperature that is at least 100° C. lower than that of the second enamel so as to form, during solidification phase k), a decoration on top of the second enamel.

20. The method according to claim 17, wherein, between phases i) and j), the method includes a step of mounting at least one nail including the following phases:

piercing a hole in one of the parts for each nail;

introducing each nail into the associated hole, the end of a stem of the nail jutting out to form a foot for the dial and the head of the nail being placed on one of the parts so that, in securing phase k), the head of the nail is trapped between the parts.

21. The method according to claim 15, wherein it includes a step of mounting at least one nail including the following phases:

piercing a hole for each nail through the entire dial;

introducing each nail into the associated hole, the end of a stem of the nail jutting out to form a foot for the dial and a head of the nail being mounted on the visible surface of the dial to form a visible decoration.

22. The method according to claim 15, wherein it includes a final step of securing at least one foot to the face opposite the visible face of the dial.

23. A method of manufacturing dial that is at least partially enamelled, and has a visible surface that includes areas standing out in relief, the method including the following steps:

a) forming a first part;

b) forming at least one hole in the first part;

c) forming a second part;

d) mounting at least one nail, wherein mounting the at least one nail includes the phases of i) piercing a hole for each nail in one of the parts;

ii) introducing each nail into the associated hole, wherein an end of a stem of the nail juts out to form a foot for the dial and a head of the nail is placed on one of the parts so that, in the securing step e), the head of the nail is trapped between the parts; and e) securing the second part to the first part so as to totally cover the periphery of said at least one hole without projecting therein, to form the final dial, wherein at least one of the parts is enamelled.

* * * * *